US012757863B2

(12) United States Patent
Axelrod et al.

(10) Patent No.: US 12,757,863 B2
(45) Date of Patent: Oct. 13, 2026

(54) PET PAD INCLUDING EDGE POCKET TO CAPTURE FLUID

(71) Applicant: FOUR PAWS PRODUCTS, LTD., Neptune City, NJ (US)

(72) Inventors: Glen S. Axelrod, Colts Neck, NJ (US); Ajay Gajria, Monmouth Junction, NJ (US)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 561 days.

(21) Appl. No.: 18/191,948

(22) Filed: Mar. 29, 2023

(65) Prior Publication Data

US 2023/0309503 A1 Oct. 5, 2023

Related U.S. Application Data

(60) Provisional application No. 63/362,071, filed on Mar. 29, 2022.

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC .. A01K 1/0157; A01K 23/005; A01K 1/0107; A01K 1/01577; A01K 1/0125; A61F 2013/15186; A61F 13/01; A61F 13/15; A61F 2013/15048; A61F 2013/15065; A61F 13/494; A61F 5/486
See application file for complete search history.

(56) References Cited

U.S. PATENT DOCUMENTS

| | | | | |
|---|---|---|---|---|
| 5,630,376 | A | 5/1997 | Ochi et al. | |
| 5,850,798 | A * | 12/1998 | Engel | A01K 1/0107 119/170 |
| 9,320,258 | B2 | 4/2016 | Haddad | |
| 9,532,546 | B1 * | 1/2017 | Klein, Jr. | A01K 1/0125 |

(Continued)

FOREIGN PATENT DOCUMENTS

| | | |
|---|---|---|
| CN | 104334012 | 2/2015 |
| CN | 107405243 | 11/2017 |

(Continued)

OTHER PUBLICATIONS

International Search Report and Written Opinion from related PCT Appln. No. PCT/US2023/065083, dated Oct. 3, 2023.

(Continued)

*Primary Examiner* — Ariana Zimbouski
*Assistant Examiner* — Matthew Wrubleski
(74) *Attorney, Agent, or Firm* — Secant IP, PLLC

(57) ABSTRACT

An absorbent floor pad, comprising a fluid impermeable layer; an absorbent layer; wherein the absorbent layer an upper layer relative to the fluid impermeable layer and adhered to the fluid impermeable layer; wherein the absorbent layer includes at least one folded edge region along an edge border region of the absorbent floor pad; wherein at least a portion of the at least one folded edge region is folded back over a base region of the absorbent layer at an acute fold angle to provide an overlap region of the absorbent layer which forms at least one edge pocket with the base region to capture liquid waste.

18 Claims, 2 Drawing Sheets

(56) References Cited

U.S. PATENT DOCUMENTS

| | | | | |
|---|---|---|---|---|
| 10,383,309 | B2 | 8/2019 | Sasano et al. | |
| 2001/0042517 | A1 | 11/2001 | Ikegami et al. | |
| 2003/0124336 | A1* | 7/2003 | Keane | A61F 13/539 428/317.1 |
| 2009/0114161 | A1* | 5/2009 | Carnahan | A01K 1/0125 119/169 |
| 2010/0176144 | A1* | 7/2010 | Askinasi | A01K 1/0107 119/171 |
| 2014/0137805 | A1* | 5/2014 | Sasano | A01K 1/0157 119/161 |
| 2014/0261209 | A1* | 9/2014 | Haddad | A01K 1/0107 119/161 |
| 2016/0242384 | A1* | 8/2016 | Huntinghouse | A01K 1/0125 |
| 2017/0266918 | A1 | 9/2017 | Plasek et al. | |
| 2017/0280671 | A1* | 10/2017 | Miller | B32B 3/06 |
| 2017/0280679 | A1* | 10/2017 | Swedyk | A01K 13/001 |
| 2019/0239483 | A1* | 8/2019 | Thibault | A01K 1/01577 |
| 2020/0170850 | A1* | 6/2020 | Ramachandran | A61F 13/15203 |
| 2022/0240481 | A1* | 8/2022 | Axelrod | A01K 1/0157 |
| 2022/0264839 | A1* | 8/2022 | Woo | B32B 5/028 |

FOREIGN PATENT DOCUMENTS

| | | | | |
|---|---|---|---|---|
| DE | 69425327 | * | 2/2001 | A61F 13/15 |
| JP | 8-117274 | | 5/1996 | |
| JP | 2015-008654 | | 1/2015 | |
| JP | 2018-078825 | | 5/2018 | |
| WO | 96/14034 | | 5/1996 | |

OTHER PUBLICATIONS

Office Action from related Japanese Appln. No. 2024-549498, dated Jul. 28, 2025. English machine translation attached.

Office Action from related Chinese Appln. No. 202380030212.1 dated Dec. 26, 2025. English machine translation attached.

* cited by examiner

PET PAD INCLUDING EDGE POCKET TO CAPTURE FLUID

CROSS-REFERENCE TO RELATED APPLICATIONS

This application claims the benefit of U.S. provisional patent application Ser. No. 63/362,071, filed Mar. 29, 2022, the entire disclosure of which is incorporated herein by reference.

FIELD

The present disclosure relates to pet floor pads, and more particularly pads that include an edge region that defines an edge pocket to capture and absorb waste, particularly urine.

BACKGROUND

Pet owners often housetrain pets so that the pet does not defecate/urinate at an undesirable location within the owner's home. For example, dog owners often train their dog to defecate/urinate outside the owner's home. In some situations, however, a dog or other pet may not be able to go outside when such needs to relieve itself. To address such situations, a pet owner may train their pet to defecate/urinate at a consistent location within their home. For example, a pet owner may train a dog or other animal to urinate/defecate on an absorbent pet pad, which may also be referred to as a floor pad or training pad, that is placed at a desired location in the home. Such pads are configured to protect underlying support surface from feces and urine, and are often configured such that the owner can easily clean up and dispose of the pad once soiled.

While pet training pads are widely utilized and can be effective, such pads are generally configured to lay substantially flat on an underlying support surface such as a floor. When a pet uses such a pad, waste (particularly urine) is then absorbed by the pad and may then soak into selected layers of the pad in order to contain such waste, and then be properly disposed by the owner. A need remains to improve on the ability of the pad to absorb urine, and in particular, reduce or prevent the urine from flowing beyond the outer edge of the pad and onto an unprotected surface before the pad has time to absorb such.

SUMMARY

An absorbent pad comprising a fluid impermeable layer and an absorbent layer adhered to the fluid impermeable layer, the absorbent layer comprising one or more layers of absorbent material composition and including an edge region. At least a portion of the edge region is folded back over the absorbent layer to provide a folded edge region which overlaps with the absorbent layer therein providing an edge pocket for capturing liquid waste.

An absorbent floor pad, comprising a fluid impermeable layer; an absorbent layer; wherein the absorbent layer an upper layer relative to the fluid impermeable layer and adhered to the fluid impermeable layer; wherein the absorbent layer includes at least one folded edge region along an edge border region of the absorbent floor pad; wherein at least a portion of the at least one folded edge region is folded back over a base region of the absorbent layer at an acute fold angle to provide an overlap region of the absorbent layer which forms at least one edge pocket with the base region to capture liquid waste.

In at least one embodiment, the absorbent floor pad has an upper face; and the at least one folded edge region has an inlet opening for fluid to enter the at least one edge pocket, wherein the inlet opening lies in an imaginary plane which extends perpendicular to the upper face.

In at least one embodiment, the inlet opening has a vertical height in a range of 0.01 inch to 0.25 inch above the upper face.

In at least one embodiment, the at least one edge pocket narrows from the inlet opening towards the fold line.

In at least one embodiment, the at least one edge pocket narrows continuously from the inlet opening towards the fold line.

In at least one embodiment, the overlap region has an overlap width in a range of 0.25 inch to 5 inches, and more particularly in a range of 0.25 inch to 3 inches.

In at least one embodiment, the acute fold angle is in a range of 1 degree to 30 degrees, and more particularly in a range of 1 degree to 15 degrees.

In at least one embodiment, the absorbent layer includes a plurality of folded edge regions along a plurality of edge border regions of the absorbent floor pad, respectively; wherein at least a portion of each of the plurality of folded edge regions is folded back over the base region of the absorbent layer at a respective acute fold angle to provide a respective overlap region of the absorbent layer which forms a respective edge pocket with the base region to capture liquid waste.

In at least one embodiment, the absorbent layer includes a plurality of respective edge pockets which are disposed along opposite edge border regions of the plurality of edge border regions.

In at least one embodiment, the absorbent layer includes a plurality of respective edge pockets which completely surround the absorbent layer.

In at least one embodiment, the absorbent pad has an edge border region which forms a continuous frame around the absorbent layer.

In at least one embodiment, the continuous frame around the absorbent layer formed by the fluid impermeable layer without the absorbent layer.

In at least one embodiment, the fluid impermeable layer is disposed beneath the at least one folded edge region of the absorbent layer, and the fluid impermeable layer disposed beneath the at least one folded edge region of the absorbent layer includes at least one air flow channel.

In at least one embodiment, the at least one air flow channel comprises a plurality of air flow channels.

In at least one embodiment, the plurality of air flow channels are substantially parallel to one another.

In at least one embodiment, the at least one air flow channel has a V-shaped cross-sectional profile.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
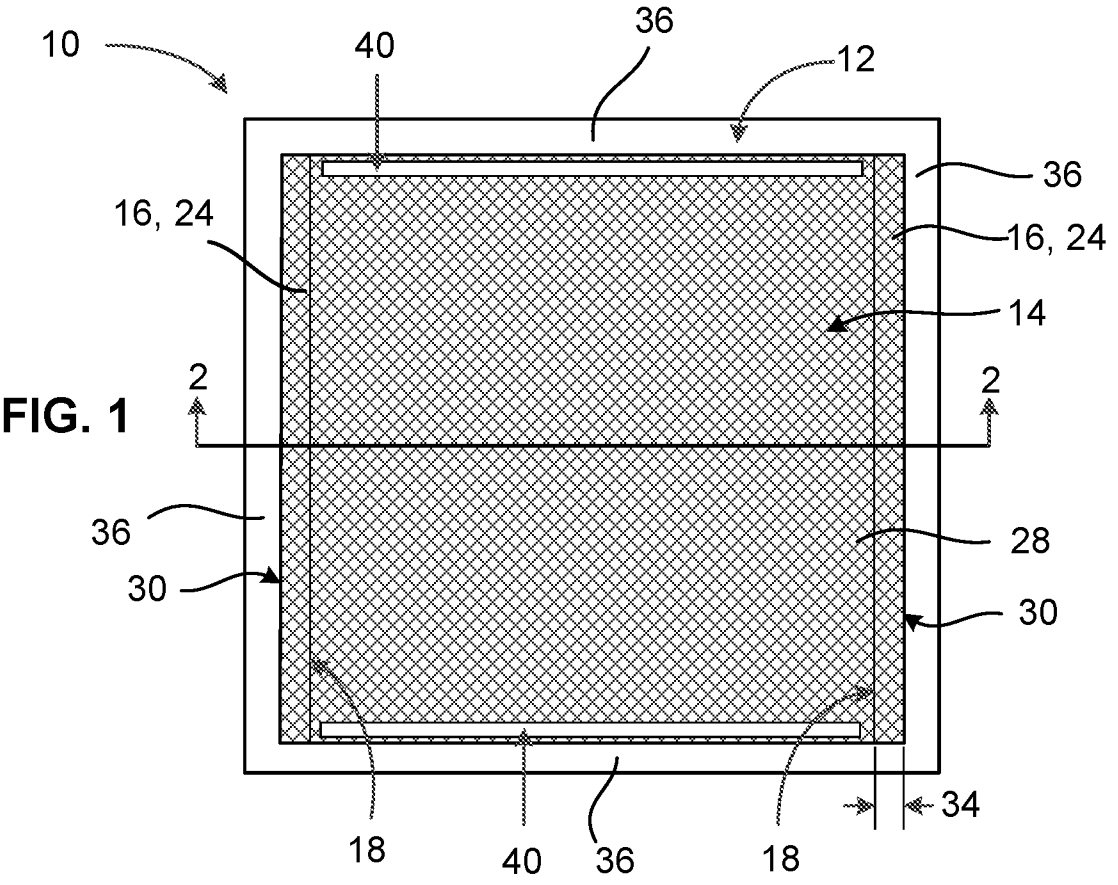
FIG. 1 is a plan view of a pet waste/training absorbent floor pad in accordance with the prevent disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Attention is directed to FIG. 1, which illustrates a pet waste/training absorbent pad 10 according to the present disclosure. The absorbent pad 10 includes a planar lower impermeable layer/portion 12 (which may also be referred to as a lower impermeable surface/face), and an upper absorbent layer/portion 14 (which may also be referred to as an upper absorbent surface/face) that is adhered, either directly or indirectly, to the lower impermeable layer/portion 12. The lower impermeable layer/portion 12 is fluid impermeable, particularly to liquids (e.g. urine) incident thereon. As such, when an animal (e.g., a dog) positions itself on the absorbent pad 10 to urinate, urine will not pass through the lower impermeable layer/portion 12 of the absorbent pad 10 and on to, for example, a planar horizontal supporting surface, such as a floor, on which the absorbent pad 10 is disposed. The lower impermeable layer/portion 12 may be made of a polymer film, such as a polyolefin film (e.g. polyethylene).

The upper absorbent layer/portion 14 is configured to be absorbent such that at least a portion of the liquid incident thereon is absorbed therein. The upper absorbent layer/portion 14 may itself be made of one or more layers of absorbent material composition that absorbs liquid (e.g. urine). Preferably, the upper absorbent layer/portion 14 may include, e.g. superabsorbent polymer, pulp, or tissue.

The superabsorbent polymer can preferably have, for example, a retention absorbency in a range of 30 g/g to 45 g/g, an absorption capacity in a range of 55 g/g to 65 g/g (as measured in a 0.9% NaCl aqueous solution), an absorptive rate (e.g., a quantity of time to absorb 50, 100, or 150 milliliters of liquid such as a 0.9% NaCl aqueous solution) in a range of 15 seconds to 40 seconds, a moisture content in a range of 4% to 9%, a measure of residual acrylic acid monomers in a range of 15 parts-per-million (ppm) to 25 ppm, and a bulk density in a range of 0.6 g/ml to 0.85 g/ml. By way of further example, the superabsorbent polymer can have a retention absorbency of 41 g/g, an absorption capacity of 60 g/g (as measured in a 0.9% NaCl aqueous solution), an absorptive rate of 29 seconds, a moisture content of 7.4%, a measure of residual acrylic acid monomers of 22 ppm, and a bulk density of 0.74 g/ml.

By way of still further example, the superabsorbent polymer can have a retention absorbency of 40 g/g, an absorption capacity of 60 g/g (as measured in a 0.9% NaCl aqueous solution), an absorptive rate of 30 seconds, a moisture content of 7.2%, a measure of residual acrylic acid monomers of 18 ppm, and a bulk density of 0.74 g/ml. Particle sizes of the superabsorbent polymer may measure less than 850 microns (μm). For example, between 80% and 90% of the particles may have a particle size measuring in a range of 180 μm to 500 μm.

As such, it should be understood that the absorbent pad 10 has an upper (fluid permeable/absorption) face 50, which is to face the animal during use thereof, and a lower (fluid impermeable/barrier) face 52, opposite the upper face 50, which is to face the underlying surface during use. As shown, edge border regions 36 of the lower impermeable layer/portion 12 form a continuous loop (picture frame) completely around the upper absorbent layer/portion 14.

Figure 2:
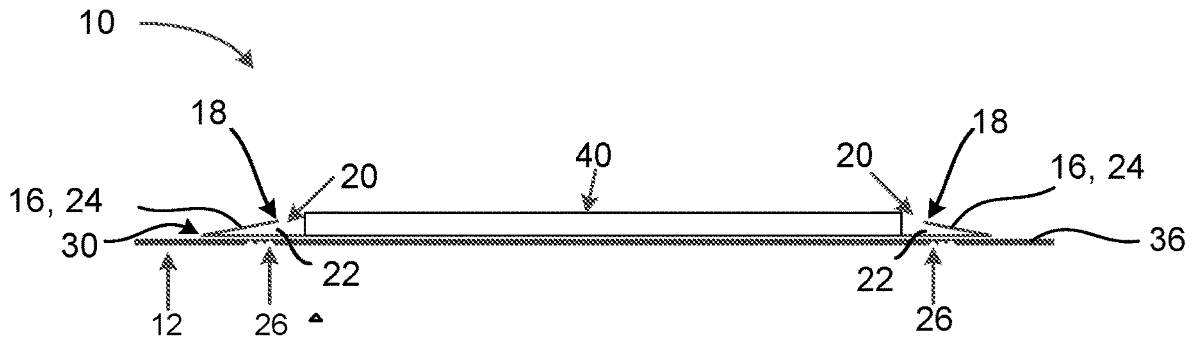
FIG. 2 is a cross-sectional side view of the pet pad in FIG. 1 taken along section line 2-2 of FIG. 1.
Figure 3:
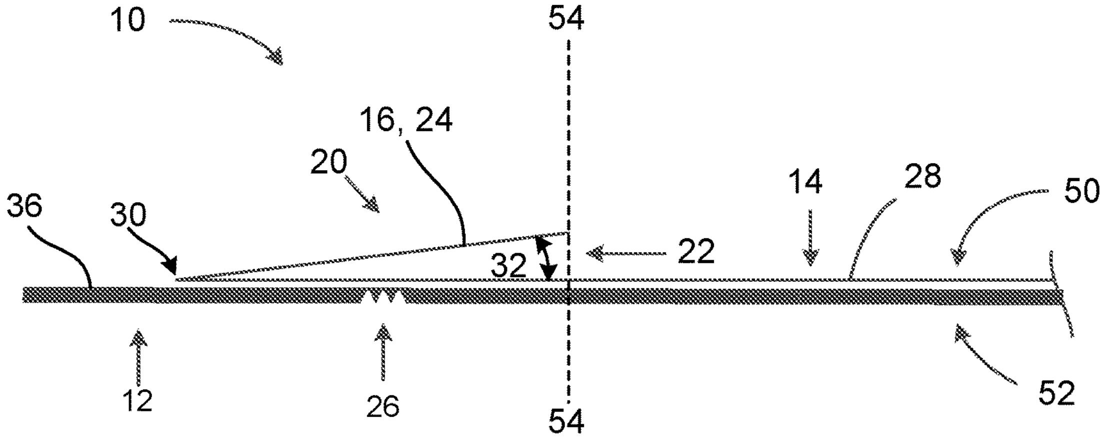
FIG. 3 is a close-up cross-sectional side view of the folded edge region of the pet pad in FIG. 1.

As best shown in FIGS. 2-3, along at least two sides of the absorbent pad 10, the upper absorbent layer/portion 14 is folded back on itself, over a base region 28 along a fold line 30 at an acute fold angle 32, to provide a folded edge region 16 of the upper absorbent layer/portion 14 that is now double in thickness and which also creates an edge pocket 20, in the form of an empty cavity, which narrows continuously towards the fold line 30 for more effectively capturing liquid waste.

As shown in FIG. 1, a terminal edge 18 of each edge pocket 20, which is also the terminal edge 18 of each folded edge region 16, extends along the entirety of the length of two sides of the upper absorbent layer/portion 14 of the four sided absorbent pad 10. While the edge pockets 20 similarly extends along the entirety of the length of two sides of the upper absorbent layer/portion 14, it should be understood that the edge pockets 20 with the terminal edge 18 may not necessarily extend along the entirety of the length of one or more sides of the upper absorbent layer/portion 14.

As shown in FIGS. 2-3, each edge pocket 20 has an inlet/opening 22, which provided an inlet/opening to the edge pocket 20 to allow for the flow (urine) therein. As shown, the inlets/openings 22 are vertical (lie in an imaginary planes (54) which are perpendicular to the top and bottom faces of the absorbent pad 10) as to face one another. As shown, the inlets/openings 22 are partially defined by terminal edge 18 of the folded edge region 16. The inlet/opening 22 may preferably have a vertical open (cross-sectional) dimension, which may be understood as a vertical height, in the range of 0.01 inch to 0.25 inch. In addition, as can now be appreciated, the edge pocket 20 will provide at least two interior opposing absorbing sides/surfaces to absorb fluid (urine), that are now strategically positioned, with respect to fluid that tends to travel towards an edge of the pad 10 and onto an unprotected floor.

FIG. 3 shows a close-up view a cross-section of an edge pocket 20. Preferably, the edge pocket 20 is defined by the folded edge region 16, which creates an overlapping region 24 that has a folded/overlapping linear dimension from the fold line 30 to the terminal edge 18 of the edge pocket 20 (which may be understood as a fold/overlap width 34) in a of 0.25 inch to 5.0 inches, and more particularly, 0.25 inch to 3.0 inches, and even more particularly of 0.25 inch to 1 inch. In such regards, the acute fold angle 32 may be in a range of 1 degree to 30 degrees, and more particularly in a range of 1 degree to 20 degrees, and even more particularly in a range of 1 degree to 15 degrees, such as 2 degrees to 12 degrees.

Figure 4:
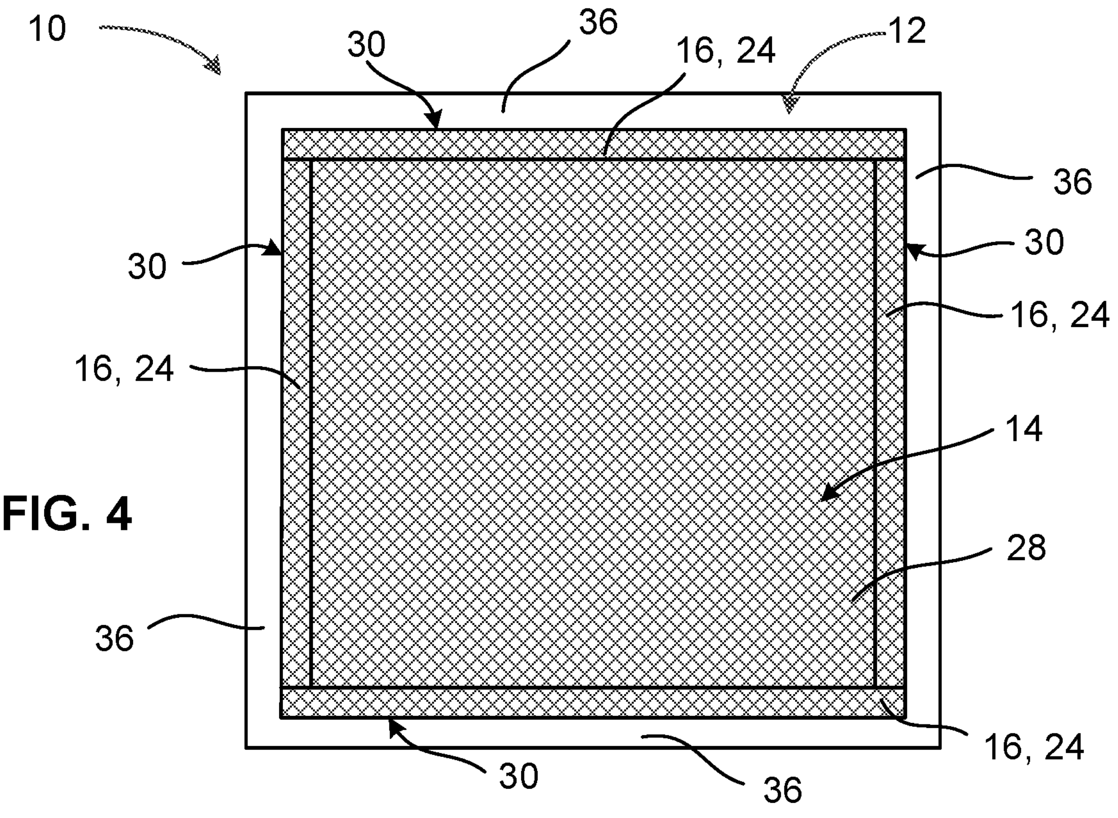
FIG. 4 is a plan view of another pet waste/training absorbent floor pad in accordance with the prevent disclosure.

It should now be appreciated that the edge pocket 20 herein may be present along one or more side edge(s) of the absorbent pad 10, such as two edges, three edges, or all four side edges in the event the absorbent pad 10 is of a polygonal geometry and more particularly a quadrilateral geometry, e.g., generally square or rectangular geometry. As shown in the variant of FIG. 4, the edge pockets 20 are disposed completely around the perimeter of the upper absorbent layer/portion 14. If the absorbent pad 10 is rounded or of any other geometrical shape, the edge pocket 20 may then extend and surround all or a segment of such pad, again serving to strategically capture fluid (urine).

Returning to FIG. 1. it is noted that the absorbent pad 10 herein may preferably have one or more other features that are designed to improve upon the ability of the pad to reduce or prevent urine from proceeding beyond the edge of the absorbent pad layer/portion 14. For example, the absorbent pad 10 herein may include one or more edge regions as defined in U.S. Patent Publication 2020/0281155 entitled "Absorbent Pad," assigned to the assignee of the present disclosure and incorporated herein by reference in its entirety.

That is, the absorbent pad 10 here may also be one that includes a liquid permeable layer, a liquid impermeable layer; and a liquid absorbent layer disposed between the liquid permeable layer and the liquid impermeable layer, the liquid absorbent layer including a first absorption region and a second absorption region, the second absorption region extending around the first absorption region, the second absorption region being configured to absorb more liquid per unit area than the first absorption region. Accordingly, when a liquid is applied to the absorbent pad 10 when in a dry state, the liquid is absorbed by the absorbent pad 10 and the absorbent pad 10 operates such that a height of the first absorption region increases; a height of the second absorption region increases; and the height of the second absorption region is greater than the height of the first absorption region; and wherein the first absorption region includes a first quantity of superabsorbent polymer, the second absorption region includes a second quantity of superabsorbent polymer and the second quantity of superabsorbent polymer measures greater than the first quantity of superabsorbent polymer. In FIG. 1, the feature of a second absorption region, which increases in height as noted above to create a raised region, is identified at reference character 40.

In addition, the absorbent pad 10 may optionally include, on the bottom of the lower impermeable layer 12, one or more elongated air flow (circulation) channels 26, which are shown with a v-shaped profile. Such channel 26 may preferably be positioned directly below the location where the folded edge region is 16 folded back over the base region 28 of the absorbent layer/portion 14 and overlaps with the absorbent layer/portion 14 therein providing the edge pocket 20. As illustrated in FIG. 2, the channel 26 may be located within the impermeable layer/portion 12 and run substantially parallel (e.g. within 5 degrees of being parallel) along the entire length of the absorbent pad 10, and provide an elongated air channel. Such edge pocket air channel 26 is contemplated to therefore provide an air gap that allows for air flow/venting. Such edge pocket air channels 26 are therefore contemplated to reduce or eliminate condensation that may otherwise collect on the bottom of the absorbent pad 10, between the absorbent pad 10 bottom and the supporting surface, particularly condensation beneath the edge pocket 20. As shown, the channels 26 are only formed in the impermeable layer/portion 12.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS

10 pad
12 impermeable layer/portion
14 absorbent layer/portion
16 folded edge region
18 edge of pocket
20 pocket
22 inlet/opening
24 overlapping region
26 channel
28 base region
30 fold line
32 fold angle
34 fold/overlap width
36 edge border/border region
40 raised (protruding) region
50 upper face
52 lower face
54 imaginary plane

What is claimed is:

1. An absorbent floor pad, comprising:
a fluid impermeable layer;
an absorbent layer;
wherein the absorbent layer is an upper layer relative to the fluid impermeable layer and adhered to the fluid impermeable layer;
wherein the absorbent layer includes at least one folded edge region along an edge border region of the absorbent floor pad;
wherein at least a portion of the at least one folded edge region is folded back over a base region of the absorbent layer at an acute fold angle to provide an overlap region of the absorbent layer which forms at least one edge pocket with the base region to capture liquid waste;
wherein the overlap region of the absorbent layer forms a portion of an upper face of the absorbent floor pad which is fluid permeable.

2. The absorbent pad of claim 1, wherein the at least one folded edge region has an inlet opening for fluid to enter the at least one edge pocket, wherein the inlet opening lies in an imaginary plane which extends perpendicular to the upper face.

3. The absorbent pad of claim 2, wherein the inlet opening has a vertical height in a range of 0.01 inch to 0.25 inch above the upper face.

4. The absorbent pad of claim 2, wherein the at least one edge pocket narrows from the inlet opening towards a fold line.

5. The absorbent pad of claim 2, wherein the at least one edge pocket narrows continuously from the inlet opening towards a fold line.

6. The absorbent pad of claim 1, wherein the overlap region has an overlap width in a range of 0.25 inch to 5 inches.

7. The absorbent pad of claim 1, wherein the overlap region has an overlap width in a range of 0.25 inch to 3 inches.

8. The absorbent pad of claim 1, wherein the acute fold angle is in a range of 1 degree to 30 degrees.

9. The absorbent pad of claim 1, wherein the acute fold angle is in a range of 1 degree to 15 degrees.

10. The absorbent pad of claim 1, wherein the absorbent layer includes a plurality of folded edge regions along a plurality of edge border regions of the absorbent floor pad, respectively;

wherein at least a portion of each of the plurality of folded edge regions is folded back over the base region of the absorbent layer at a respective acute fold angle to provide a respective overlap region of the absorbent layer which forms a respective edge pocket with the base region to capture liquid waste.

11. The absorbent pad of claim 10, wherein the absorbent layer includes a plurality of respective edge pockets which are disposed along opposite edge border regions of the plurality of edge border regions.

12. The absorbent pad of claim 10, wherein the absorbent layer includes a plurality of respective edge pockets which completely surround the absorbent layer.

13. The absorbent pad of claim 1, wherein the edge border region forms a continuous frame around the absorbent layer.

14. The absorbent pad of claim 13, wherein the continuous frame around the absorbent layer is formed by the fluid impermeable layer without the absorbent layer.

15. The absorbent pad of claim 1, wherein the fluid impermeable layer is disposed beneath the at least one folded edge region of the absorbent layer, and the fluid impermeable layer disposed beneath the at least one folded edge region of the absorbent layer includes at least one air flow channel.

16. The absorbent pad of claim 15, wherein the at least one air flow channel comprises a plurality of air flow channels.

17. The absorbent pad of claim 16, wherein the plurality of air flow channels are substantially parallel to one another.

18. The absorbent pad of claim 15, wherein the at least one air flow channel has a V-shaped cross-sectional profile.

* * * * *